United States Patent
Bartys

[11] Patent Number: 5,832,652
[45] Date of Patent: Nov. 10, 1998

[54] CLIP-ON TIP UP DEVICE

[76] Inventor: Stephen D Bartys, 1676 N. Seven Mile, Pinconning, Mich. 48650

[21] Appl. No.: 827,637

[22] Filed: Apr. 10, 1997

[51] Int. Cl.[6] .......................... A01K 93/02; A01K 97/12
[52] U.S. Cl. ........................................ 43/17; 93/15; 93/16
[58] Field of Search ...................................... 42/17, 15, 16

[56]  References Cited

U.S. PATENT DOCUMENTS

| | | |
|---|---|---|
| 1,995,067 | 3/1935 | Killory . |
| 2,869,275 | 1/1959 | Levin .......................................... 43/17 |
| 2,931,122 | 4/1960 | Thordson et al. ............................ 43/17 |
| 3,143,822 | 8/1964 | Schooley ..................................... 43/17 |
| 3,199,241 | 8/1965 | Mauritz ....................................... 43/17 |
| 4,120,111 | 10/1978 | Young, Jr. ................................... 43/17 |
| 4,146,988 | 4/1979 | Bednarczyk ................................ 43/17 |
| 4,662,099 | 5/1987 | Stewart ....................................... 43/17 |
| 5,005,310 | 4/1991 | Rhinehart ................................... 43/17 |
| 5,044,108 | 9/1991 | Rhinehart ................................... 43/17 |
| 5,067,269 | 11/1991 | Eppley et al. .............................. 43/17 |
| 5,068,995 | 12/1991 | Rhinehart ................................... 43/12 |
| 5,097,618 | 3/1992 | Stoffel ......................................... 43/17 |
| 5,163,243 | 11/1992 | Wold, Jr. et al ............................ 43/17 |
| 5,231,784 | 8/1993 | Condusta .................................... 43/17 |
| 5,598,656 | 2/1997 | Strasser ....................................... 43/17 |

FOREIGN PATENT DOCUMENTS

| | | | |
|---|---|---|---|
| 221632 | 7/1968 | Sweden ..................................... | 43/17 |

*Primary Examiner*—Michael J. Carone
*Assistant Examiner*—Arpad Fabian Kovacs
*Attorney, Agent, or Firm*—Reising, Ethington, Learman & McCulloch PLLC

[57]  ABSTRACT

A clip-on tip-up apparatus for fishing includes a springy signal arm secured at its lower end to a releasable mounting clamp for attachment to a fishing rod in any of a number of locations. The signal arm carries a brightly colored flag near its upper free end along with a spring clip line clamp which enables the signal arm to be attached directly to a slackened fish line with sufficient force to retain the fish line releasably between opposed jaws of the line clamp and to hold the signal arm in a bent over set position. The fish line pulls free of the line clamp when a fish strikes the bait at the end of the line causing the signal arm to snap upright signaling the fisherman that a fish has taken the bait.

24 Claims, 3 Drawing Sheets

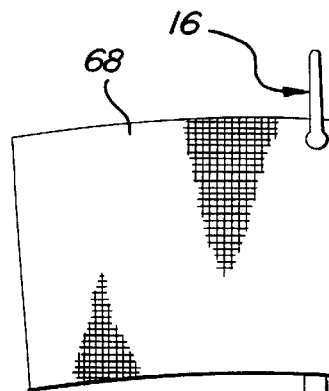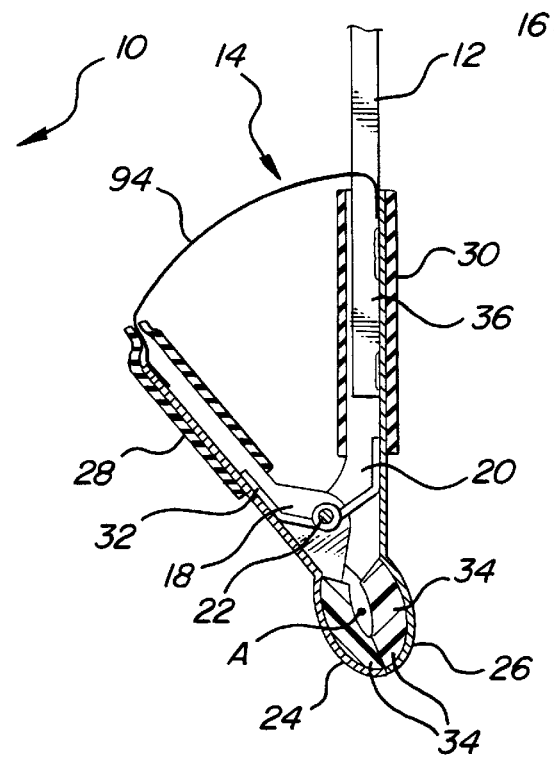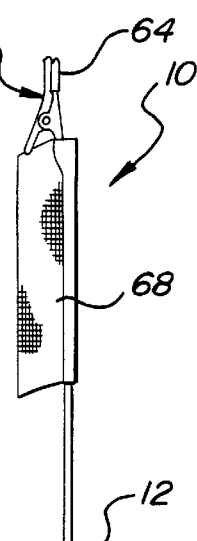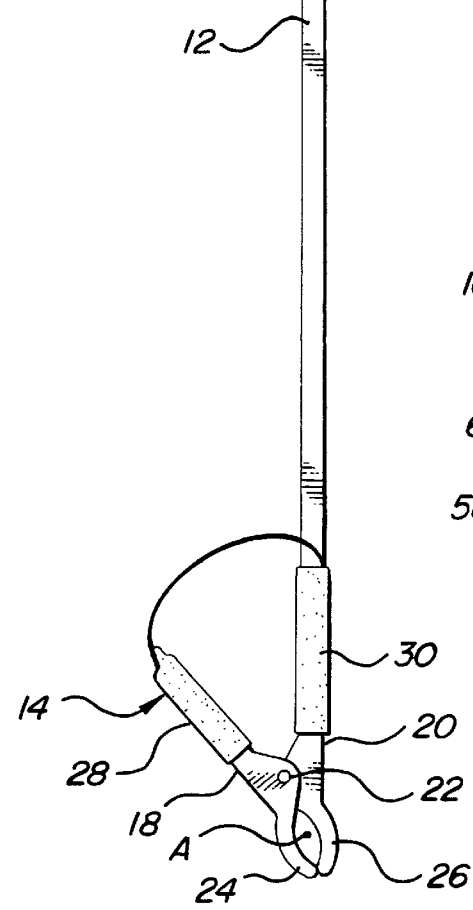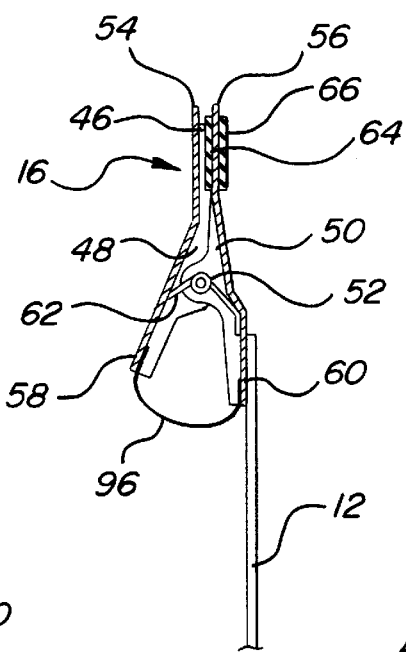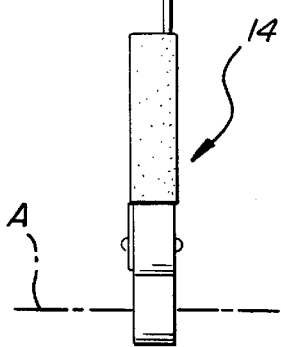
FIG-1
FIG-3
FIG-2
FIG-4

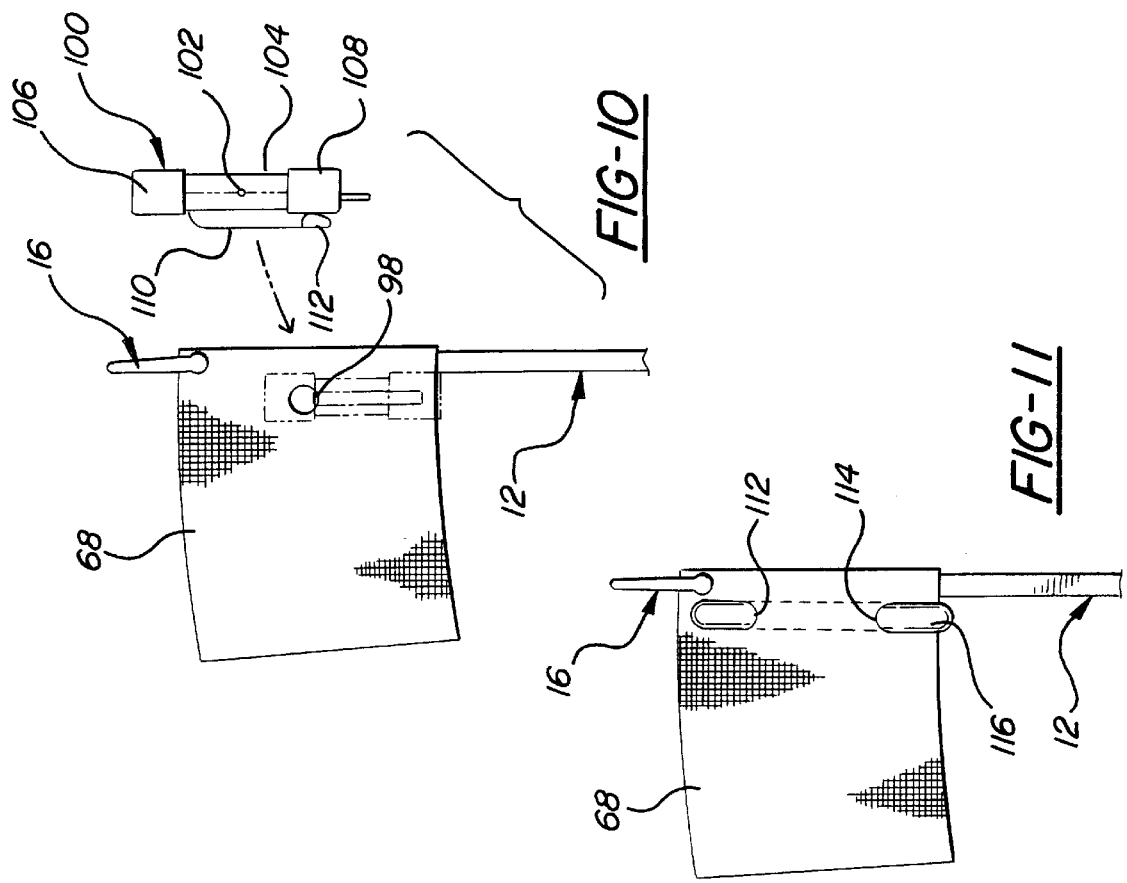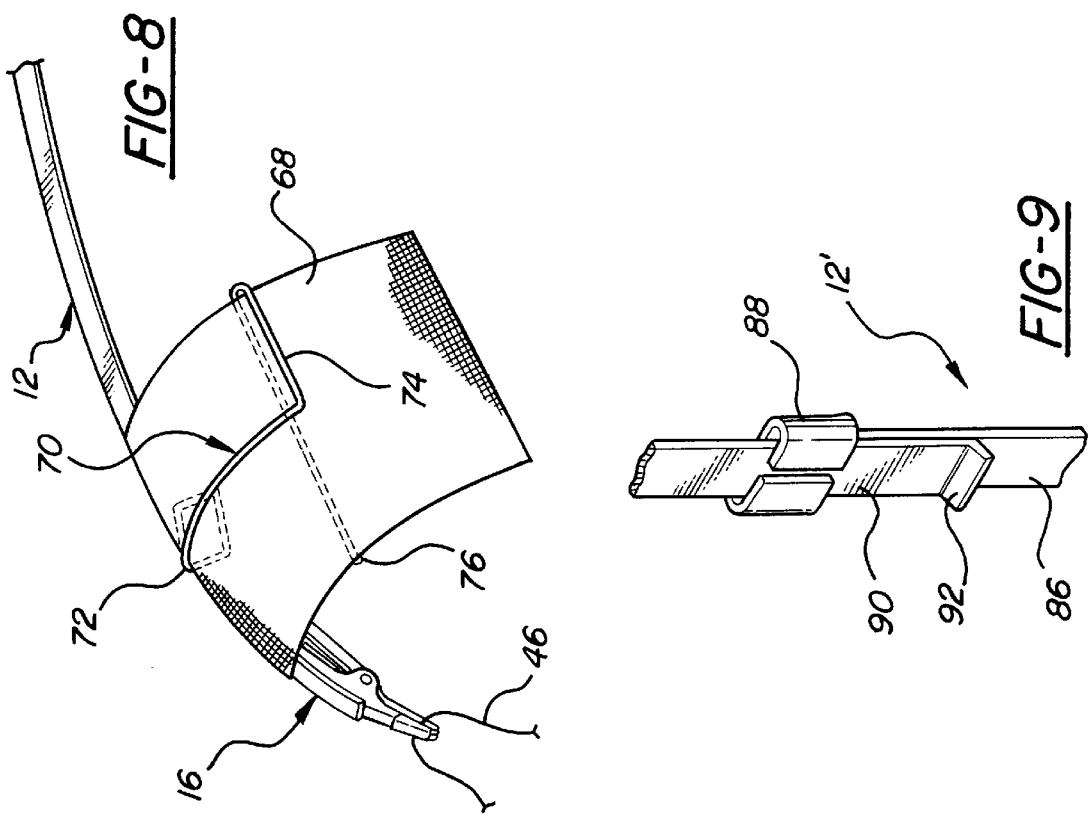

CLIP-ON TIP UP DEVICE

This invention relates to tip-up devices for fishing and more particularly those that mount releasably to a fishing rod.

BACKGROUND OF THE INVENTION

The prior art contains many examples of tip-ups for fishing. Most are integrated with the fishing rig and include an arm having a flag or other indicator mounted on a frame of the rig. A releasible trip mechanism connects the arm to the fish line or to the spool onto which it is wound in order to hold the arm in a bent over ready position until such time as a fish strikes the bait. In response to the strike, the trip mechanism releases the arm which snaps upright signaling the fisherman that a fish has taken the bait. Such all-in one rigs are cumbersome and intended primarily for ice fishing.

A few of the known tip-up devices are of the self contained, clip-on variety constructed independent from the fishing rig, enabling them to be attached to any of several rigs without modification. Examples of such clip-on tip-ups include those disclosed in U.S. Pat. Nos. 2,931,122 to Thordson et al and 3,199,241 to Mauritz. These devices have several disadvantages associated with their construction, many of which are attributable primarily to the triggering mechanism employed to hold the arm in the bent over set position.

The arm of the Thordson et al patent is held in the set position by extension of the free end of the arm through the end-most eye of the rod on which it is mounted. This, of course, limits the positions on the rod where the device may be mounted to those where the end of the arm is able to engage the end-most eye of the rod. Another disadvantage is that the free edge of the arm moves across the fish line as it is inserted through the eye and remains in contact while the arm is set, which may abrade and weaken the fish line over time. Moreover, when a fish strikes the bait, it applies a sudden tension force to the line which urges the line sharply against the free edge of the arm for purposes of releasing the arm which, for similar reasons, would be prone to damaging or weakening the fish line. Still a further disadvantage is that the device would not be suitable under conditions where the fish rod is likely to be jostled, bumped, or moved about, such as one fishing off a dock or a boat, since such movements of the rod would likely jar the sensitive arm out of engagement with the eye sending a false signal to the fisherman.

The tip-off device of Mauritz shares many of the same disadvantages in addition to being cumbersome, bulky and prone to malfunction under cold weather fishing conditions. The indicator arm of Mauritz is secured at its lower end to an elongate metal bar and formed at its upper end with a loop. The bar has one or more spring clips enabling it to be clamped releasably to a rod and is formed with an opening at its forward end accommodating a rotatable wire-form trip mechanism formed with hooks at its ends which engage the loop of the arm and a slackened fish line, respectively, when in the set position. The strike by a fish tensions the line causing the trip wire to rotate out of engagement with the loop of the arm which snaps to the upright signaling position. The requirement of the trip wire and support bar adds to the bulk, weight, cost, and complexity of the device. Further, the opening of the bar which supports the trip wire would be prone to freezing closed during ice fishing limiting or perhaps preventing rotation of the trip wire in the manner called for. The trip wire setup also would be unsuitable under conditions where the rod is subject to movement, some such would likely cause the trip wire to disengage prematurely from the arm sending a false signal to the fisherman.

The clip-on tip-up device of the present invention overcomes or greatly minimizes the foregoing objections.

SUMMARY OF THE INVENTION

A tip-up signal device for a fishing rod comprises a signal arm fabricated of resilient springy material supported at one end by a releasable mounting clamp for the releasable attachment of the device to a fishing rod or adjacent support structure and enabling an opposite free end of the arm to move between an upright signaling position and a bent over set position. A spring clip is mounted on the signal arm adjacent its free end. The spring clip has opposed gripping jaws that are spring biased toward engagement with one another but moveable apart in response to application of a bodily opening force to the spring clamp to provide a gap between the jaws sufficiently wide to accommodate the placement of a slackened fish line of the rod between the jaws, with the jaws being returnable upon removing the bodily opening force to grip end releasability retain the fish line between the jaws with sufficient force to retain the spring arm in the set position while enabling the jaws to release the fish line in response to the tensioning of the line caused by a fish striking a bait secured to the line enabling the spring arm to snap to the upright position to signal the fisherman that a fish has taken the bait.

One principal advantage that the invention has over the prior known clip-on tip-ups is that the signal arm attaches directly to the fish line in a set position rather than engaged with the eye of the rod or with a separate trip wire. The direct line attachment together with the resilient nature of the signal arm enables the device to operate under most any fishing conditions, including where the rod is likely to be moved about or jostled, such as when fishing from a dock or off a boat. In such cases, the shock of the sudden movement is taken up by the resistancy of the signal arm so as to maintain engagement with the fish line.

Another advantage of providing the spring clamp line attachment on the end of the signal arm is that it eliminates the need for a separate trip wire mechanism and the support structure needed to mount the trip wire forwardly of the signal arm, providing a much simpler, lightweight construction.

Another advantage that the direct line attachment provides is that enables the device to be mounted on the rod in a number of different positions and in doing so to vary the action of the rod and device. According to one particular setup, the spring clip is engaged with the length of line extending beyond the end of the pole and in doing so the signal arm is moved about by the wind which in turn produces corresponding movement in the fish line and hence the bait at the end of the line for a more enticing, life-like presentation to the fish, particularly for dead bait. In this way, the device actually takes advantage of movement of the wind to impart action to the bait, which is detrimental to the operation of the prior tip-up devices.

The direct line connection that the spring clamp provides further enables the device to support the fish line of an open face reel with the bale open and retaining the line tightly wound on the spool until such time as a fish strikes whereupon the line is released from the spring clip and allowed to feed freely from the spool.

THE DRAWINGS

The presently preferred embodiment of the invention is disclosed in the following description and in the accompanying drawings, wherein:

FIG. 1 is a front view of a tip-up device constructed in accordance with a preferred embodiment of the invention;

FIG. 2 is a side elevational view of the device of FIG. 1;

FIG. 3 is an enlarged fragmentary cross-sectional view of the lower mounting portion of the device;

FIG. 4 is an enlarged fragmentary cross-sectional view of the upper line clamping portion of the device;

FIG. 8 is an enlarged fragmentary perspective of an alternative shapable flag support;

FIG. 9 is a fragmentary view of an alternative adjustable length indicator arm extension; and FIGS. 10 and 11 are alternative embodiments of an indicator flag provided with holes for mounting an indicator light.

DETAILED DESCRIPTION

Figure 5:
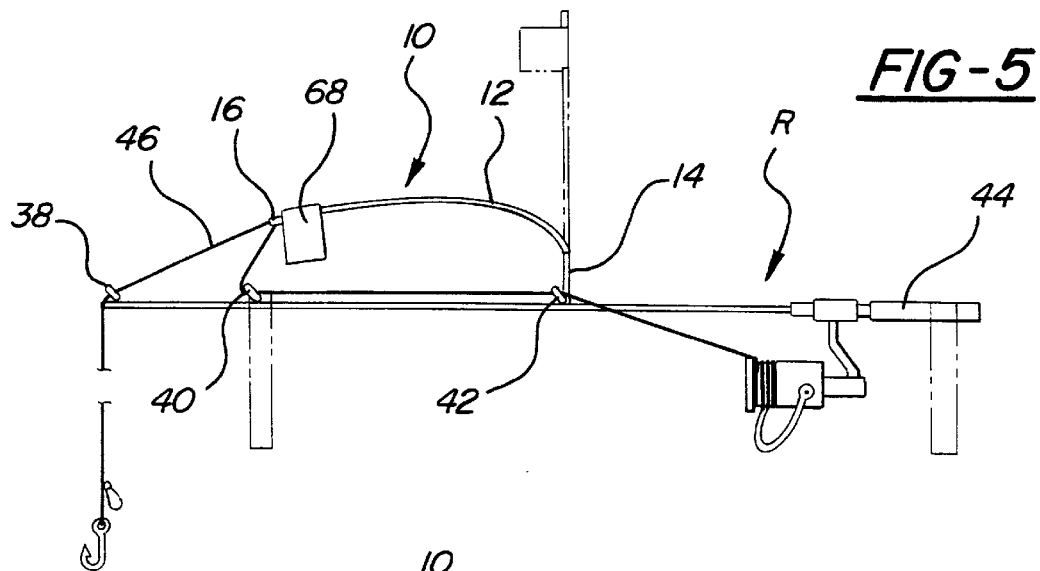
FIGS. 5–7 illustrate various ways in which the device may be mounted on a fishing rod.

A clip-on tip-up apparatus constructed in accordance with the presently preferred embodiment of the invention is designated generally by the reference numeral 10 in FIGS. 1–7 and comprises a resistant signal arm 12 fixed at its lower end to a releasable mounting clamp 14 and mounting adjacent its opposite free end a releasable line clamp 16.

The mounting clamp 14 is preferably a spring clip-type device having a pair of laterally opposed arms 18, 20 coupled by a pivot connection 22 intermediate the ends of the arms 18, 20 defining a set of clamping jaws 24, 26 at the ends of the arms at one side of the pivot connection 22, and handle portions 28, 30 on the opposite side of the pivot connections 22. A spring 32 in the preferred form of a torsion spring is mounted between the arms 18, 20 about the pivot connection 22 in such manner that the free ends of the spring 32 act on the arms 18, 20 to urge the jaws 24, 26 constantly toward engagement with one another with a clamping force sufficient to enable the mounting clamp 14 to be secured firmly but releasably on most any portion of a fishing rod R or a support surface adjacent the rod.

The jaws 24, 26 are preferably lined with resilient foam padding or dense neoprene rubber material 34 or other suitable resistant compressible high friction material in order to enhance the gripping action of the clamp 14 on the rod R to resist sliding or rotation relative to the rod when mounted thereon. The foam liner 34 also serves to protect the rod or support surface on which the mounting clamp 14 is secured from being marred by the jaws 24, 26.

The jaws 24, 26 can be opened by compressing the handle portion 28, 30 together with sufficient force to overcome the closing force of the spring 32, and once opened can be mounted on the rod in any of a number of different positions for purposes to be explained below. Releasing the compressive force on the handles 28, 30 closes the jaws 24, 26 about the rod R by action of the constant closing force applied by the spring 32. It is to be observed that the jaws 24, 26 of the clamp 14 present inwardly facing arcuate clamping surfaces arranged on opposite sides of a central longitudinal clamping axis A that is spaced from but parallel to the axis of the pivot connection 22 in order to conform with the generally cylindrical shapes of the rod, including its shank 36, eyes 38–42 and handle or grip 44 such that the axis A of the clamp 14 aligns itself in the longitudinal direction of the rod R.

The signal arm 12 is fabricated of a resistant springy material having memory which enables the arm 12 to be bent over to a bowed configuration in response to application of a bending force but then returned to a generally linear configuration upon removal of the bending force. Spring steel strapping or band stock is the preferred material for the signal arm 12. Its width dimension is substantially greater than its thickness dimension which causes the arm 12 to flex easily in a plane perpendicular to its width and offer greater resistance to bending out of the plane. The preferred signal arm band material is blue tempered spring steel measuring about 18 inches in length, 0.25 inches in width, and 0.015 inches thickness.

The lower end of the arm 12 is secured to one of the handles 28 or 30 of the clamp 14 in any suitable manner, but preferably by soldering, braising or welding them together. The signal arm 12 is oriented such that the broad, width-wise surfaces of the arm 12 lie perpendicular to the clamping axis A in order that the axis A lie in the plane of least resistance to bending of the arm 12. In this way, the arm 12 bends more easily along the length of the rod R and offers resistance if bent laterally to one side or the other of the rod R.

The line clamp 16 carried adjacent the free end of the signal arm 12 is preferably of the same general spring clip construction as that of the mounting clamp 14, but adapted specifically for releasably clamping the fish line 46 of the rod R as will be explained below. The line clamp 16 thus includes a pair of laterally spaced arms 48, 50 coupled together intermediate their ends by a pivot connection 52 defining clamping jaws 54, 56 at the ends of the arm on one side of the pivot connection 52, and compressible handle portions 58, 60 on the opposite side of the pivot connection 52. The spring 62 acts on the arms 48, 50 in such manner as to urge the jaws 54, 56 constantly toward one another with a predetermined line clamping force significantly less than that of the mounting clamp 14, and preferably in the range about 0.25–2 pounds and more preferably about 0.75 pounds which is sufficient to clamp and releasably retain the line between the jaws 54, 56 without applying so much pressure as to damage or weaken the fish line 46.

As shown best if FIGS. 1 and 4, the line clamp 16 is preferably rigidly mounted on the spring arm 12 and preferably by securing one of the handle portions 60 of the clamp 16 to one of the broad width wise sides of the spring arm such that the arms 48, 50 extend in the longitudinal direction of the signal arm 12 and more preferably with the jaws 54, 56 extending in prolongation from the free end of the signal arm. The other handle 58 is supported outwardly of the signal arm 12 and is free to move relative to the handle 60 fixed to the arm 12. The moveable handle 58 advantageously projects from the second arm 12 in the plane of bending rather than to one lateral side or the other of the arm 12 which minimizes the opportunity for the handle 58 to snag the rod during use.

The jaws 54, 56 are preferably flat and generally parallel and one or both, but preferably only one of the jaws 56 is provided with a resistant gripping surface 64, which may comprise a thin, soft plastic or rubbery sheath 66 secured such as by thermal shrink fitting about the jaw 56.

Mounted adjacent the line clamp 16 on the signal arm 12 is a flag 68 which may be fabricated of brightly colored cloth material. The flag 68 enhances the visibility of the signal arm 12 when presented in an upright signaling position.

THE OPERATION

Referring now to FIG. 5, the apparatus 10 may be mounted on a standard fishing rod R like the one illustrated or any other standard fishing rod without requiring any modification of the rod of apparatus 10. To mount the apparatus 10 in the manner illustrated in FIG. 5, the user simply compresses the handles 28, 30 to open the jaws 24, 26 of the mounting clamp 14 to provide sufficient space between the jaws to enable the clamp 14 to be positioned about the shank 36 or perhaps in eye 42 of the rod R in a location rearwardly of the forward-most two eyes 38, 40 of the rod R. Once positioned, the handles 28, 30 are released causing the spring 32 to close the jaws 24, 26 about the rod R securing it firmly but releasably in position.

The user then grasps the signal arm 12 and bends it forwardly after which a loop of slackened fish line 46 taken up between the forward two eyes 38, 40 of the rod R is secured to the signal arm 12 via the line clamps 16. To clamp the fish line 46, the handles 58, 60 are compressed by the user with one hand to open the jaws 54, 56 sufficiently to enable the looped fish line 46 to be guided into the gap between the open jaws 54, 56. Once positioned, the handles 58, 60 are released causing the jaws 54, 56 to close about the fish line 46 by the return action of the spring 62. As illustrated best in FIG. 4, the fish line 46 is contacted by the flat gripping surfaces of the jaws in order to hold the line without directing any sharp edges against the line. The resistant sheath 66 provides enhanced frictional resistance to the sliding of the fish line 46 out of the jaws 54, 56, lessening the clamping force required to hold the line, and thereby reducing stress on the line.

The jaws 54, 56 are preferably fabricated of a malleable metal material such a copper which enables the angulation between the jaws 54, 56 to be adjusted by simply bending the jaws inwardly or outwardly of one another. To accommodate a larger diameter fish line, for example, the user may wish to bend the jaws 54, 56 somewhat inwardly which can be accomplished by compressing the handle portions 58, 60 with one hand and, while hold the jaws 54, 56 open, applying an inward pinching force to the jaws with the other hand such that when closed the jaws are angled inwardly toward one another by a few degrees, causing the jaws to be generally parallel and perhaps slightly flared when engaging the large diameter fish line. It will be appreciated that the sensitivity of the line clamp 16 can be adjusted by varying the angle between the jaws 54, 56, with tapering jaws offering greater resistance to the pulling of the fish line 46 free of the jaws then that offered by flared jaws.

It is to be noted that the clamping force of the line clamp 16 and the spring back return force of the signal arm 12 are balanced such that the line clamping force is not so great as to offer too great of resistance to the release of the fish line, yet is sufficiently great as to hold the signal line 12 in the bent over set position (solid line position of FIG. 5). It is preferred that the spring back force of the signal arm 12 be relatively small so that it provides just enough force to enable the arm 12 to spring and support itself upright when released from the fish line 46. In the preferred embodiment, the signal arm 12 offers about 1 to 1 ½ ounces of spring back force applied to the line clamp 16 when in the set position.

Once set, the signal arm remains in the bent over position until such time as a fish strikes a bait secured to the end of the fish line 46. The sensitive nature of the signal arm 12 enables it to absorb any vibration or sudden movement forces imparted to the fish rod R when fishing from a boat, a dock, or under high wind conditions. The resiliency of the signal arm 12 thus acts as a shock absorber enabling the line clamp 16 to remain attached to the fish line 46.

When a fish strikes the bait at the end of the line 46, it causes the line to be suddenly tensioned, stripping the slackened loop of line free of the grasp of the jaws 54, 56. The release of the line 46 causes the signal arm 12 to snap upright to its signaling position (phantom lines in FIG. 5) alerting the fisherman to the fact that a fish has taken the bait.

Figure 6:
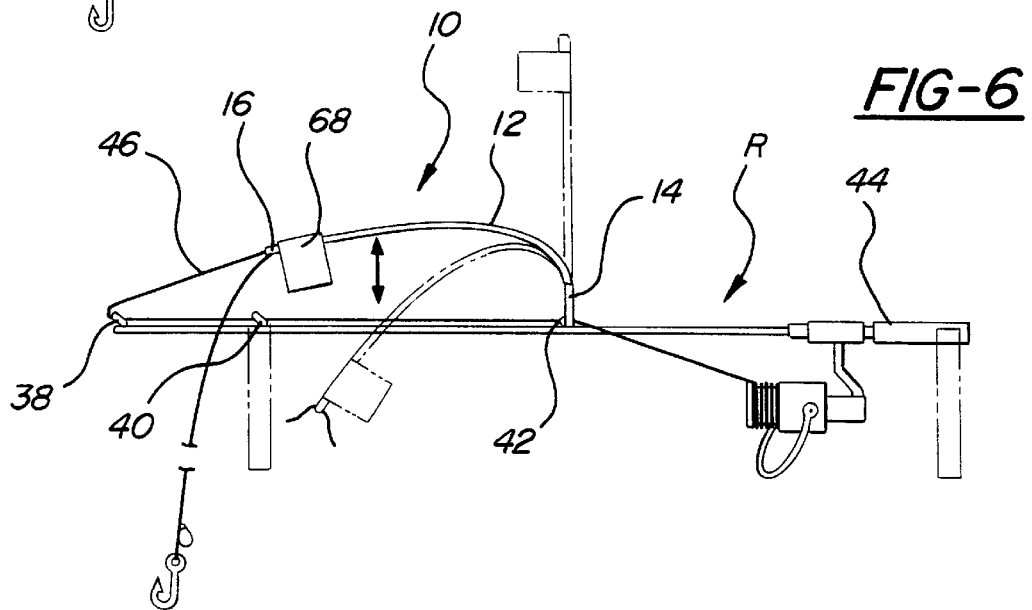

FIG. 6 illustrates another usage of the apparatus 10. The apparatus 10 is attached in the same manner to the pole R and line 46 but in this instance the slackened loop is taken from the length of fishing line extending beyond the end of the pole rather than between the endmost two eyes as in FIG. 5. Attaching the line clamp 16 to the length of line beyond the rod R enables the signal arm 12 to bob up and down with greater range of movement than that of the setup of FIG. 5. The FIG. 6 setup takes advantage of the forces of wind acting on the signaling arm and particularly the flag 68 to impart action to the bait at the end of the line 46. The free arm of the arm 12 is able to flex between positions above and below the rod R, causing the bait to move up and down with the arm 12. Again, the highly resilient nature of the signal arm 12 and its low spring back force permits the signal arm 12 to move above in the wind without detaching from the fish line 46.

FIG. 8 shows an alternative flag reinforcement device 70 that may be used in conjunction with the flag 68 to control its shape and presentation to the wind to obtain more or less bobbing action of the arm 12 particularly when the apparatus 10 is set up in the FIG. 6 arrangement. The reinforcement device 70 provides a means of rendering the flag 68 shape-retentive. The device 70 may comprise a wire-form clip fabricated of a malleable material, such as aluminum, steel, copper, etc., having a generally L-shaped configuration, a first leg 74 which is attached a its inward end to the arm 12 and flag 68 by a somewhat springy retainer portion 78 that is doubled back along the leg 74 and operates much like a standard spring-form paper clip, enabling the device 70 to be slid into engagement with the flag 68 and signal arm 12, as shown, with the retainer 76 extending along one side of the signal arm 12 and the leg 74 extending along the opposite side along the body of the flag 68. The other leg 78 extends laterally from the distal end of the first leg 74 in the width-wise direction of the flag and is bent back upon itself to extend on the opposite side of the flag as well to capture the flag and retain it in engagement against the first leg 74.

While the device 70 is disclosed as being a separate detachable element from the signal arm 12 and flag 68, it will be appreciated that the device 70 could just as well be embedded in the flag 68 or the flag itself fabricated of a shape-retentive material that would enable the flag 68 to be formed and remain in any of a number of desired shapes and orientations with respect to the signal arm 12 to suit the particular wind conditions. As shown in FIG. 8, for example, the leg 74 has been bowed to shape and support the flag 68 in a downwardly curving configuration which would have a tendency to produce more action of the signal arm 12 in the wind since a greater surface area of the flag is presented to the wind.

Figure 7:
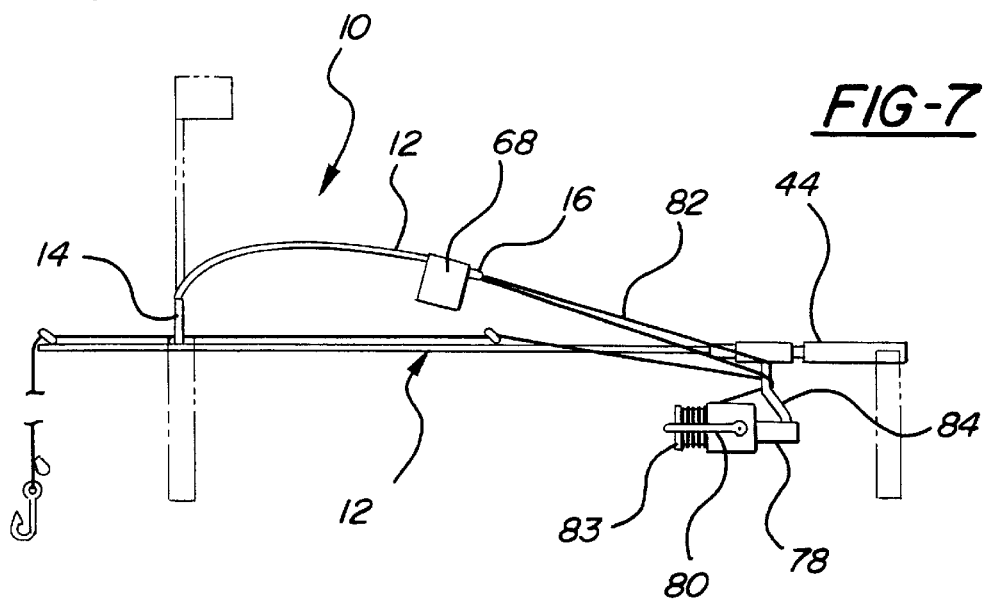

FIG. 7 illustrates yet another mounting arrangement for the apparatus 10 for use in conjunction with an open face fishing reel 78 set with its bail 80 in the open position. The apparatus 10 is mounted in the same general manner as described with respect to FIG. 6 except that the arm 12 is bent rearwardly toward the reel 78. The line clamp 16 releasably holds a loop 82 of the fish line 46 that has been stripped from the spool 83 of the reel 78 and wrapped behind the mounting base 84 of the reel 78 as shown. With the signal arm 12 set, the line coming off the spool 83 is supported by the arm 12 against unraveling even under windy fishing conditions. When a fish strikes the bait, the loop 82 is pulled free of the line clamp 16, after which the line 46 is free to strip from the reel 78 as the fish runs with the bait without offering any drag resistance due to the open setting of the bail 80.

FIG. 9 shows an alternative adjustable length construction for the signal arm 12' which, apart from its adjustment, operates in the same manner as the signal arm 12 described above. The adjustable length arm 12' includes a lower section 86 fixed to the mounting clamp at its lower end and mounting a retainer 88 adjacent its upper free end. The retainer 88 may comprise an metal or plastic band that encircles the lower section 86 and slidably accommodates an upper section 90 of the signal arm 12', enabling the upper section 90 to telescope along the length of the lower section 86 between an extended use position and a compact stowed position. The lower end of the upper section 90 is preferably formed with an enlargement 92 that confronts the retainer 88 when in the fully extended condition to secure the upper section 90 from sliding out of disengagement with the lower section 88. The enlargement 92 may take the form of an outwardly rolled edge, as illustrated, or various other constructions which perform the stopping function while enabling relative sliding movement of the sections 86, 90.

In accordance with still further features of the invention, both the pole clamp 14 and line clamp 16 may be fitted with bridging elements 94, 96, respectively, that extend across and bridge the gap between the handles 28, 30 and 58, 60 of the clamps. The bridging elements 94, 96 function to prevent the fishline 46 of the rod from becoming entangled with the clamps 14, 16 when the device 10 is mounted on the pole. The elements 94, 96 may take any of a number of forms that would function to close the gap between the handles without inhabiting the operation of the clamps. A presently preferred embodiment of the bridging elements 94, 96 is in the form of a heavy test nylon fishline, or to the like, attached at its opposite ends to the handles of the clamps as shown best in FIGS. 3 and 4 such as, for example, by a suitable adhesive. The length of such fishline is sufficient to allow the clamps 14, 16 to fully open and close, and the flexibility of such line enables it to perform under all fishing conditions, including extreme low temperatures encountered during ice fishing.

According to still another embodiment of the invention shown in FIG. 10, a through hole 98 is provided in the flag 60 adjacent the spring arm 12 to accommodate the mounting of a position sensitive indicator light 100. The light 100 is of the common type having a bulb 102 encased in a see through tubular housing 104 closed at its opposite ends by plastic end caps 106, 108. The housing 104 supports a battery (not shown) coupled to the light bulb 102 through mercury switch (also not shown). A resilient mounting arm 110 is fixed at its upper end between the housing 104 and end cap 106 and extends therefrom along the length of the housing 104 to a lower free end 112 that is flexible outwardly of the housing 104 when acted upon by an outward force, but returns inwardly against the lower end cap 108 when the force is removed.

The hole 98 enables the indicator light 100 to be attached to the flag 68 by passing the free end 112 of the mounting arm 110 of the light 100 through the hole 98 and sliding the light 100 downwardly until the lower edge of the hole 98 confronts the upper end of the mounting arm 110. In this way, the indicator light 100 is attached securely but releasably to the flag 68 and is less likely to become dislodged and lost as they are prone to when attached to the upper free edge of such flags. The hole 98 also positively locates the indicator light 100 adjacent the spring arm 12 to provide adequate support to the indicator light 100.

The light mounting feature of FIG. 10 is best utilized when combined with the adjustable length spring arm 12 of FIG. 9, allowing the user to adjust the length of the pole 12 to provide just enough return force, as described previously, to return the arm 12 upright upon releasing the fishline 46.

FIG. 11 illustrates yet another embodiment in which two holes 112, 114 are formed in the flag adjacent the spring arm 12 in spaced relation to one another to accept a glow stick-type indicator light 116. In each of the case of FIGS. 10 and 11, the lights 100 and 116 can be used in conjunction with the flag reinforcement device 70.

The disclosed embodiments are representative of presently preferred forms of the invention, but are intended to be illustrative rather than definitive thereof. The invention is defined in the claims.

I claim:

1. Tip-up signalling apparatus for a fishing rod comprising:

a signal arm fabricated of resilient springy material;

a releasable mounting clamp secured to one end of said signal arm for detachably mounting said signal arm to a fishing rod or adjacent support structure and supporting said signal arm for movement between an upright signalling position and a bent over set position; and a line clamp mounted on said signal arm adjacent an opposite free end thereof having opposed clamping portions spring biased constantly toward engagement with one another and deflectable relatively outwardly of one another in opposition to the bias force to grip and releasably retain fishing line of the rod between said clamping portions.

2. The apparatus of claim 1 wherein said line clamp comprises a spring clip and said clamping portions comprises jaws of said spring clip.

3. The apparatus of claim 2 wherein said gripping jaws are movable away from one another in response to application of a bodily opening force to said spring clamp to provide a gap between said jaws, said gap accommodating the placement of the fish line between said jaws when said signal arm is bent to said set position, said jaws being self-returnable toward one another in response to removing said applied opening force to grip and releasably hold the fish line between said jaws with sufficient line clamping force to retain said spring arm in said set position while enabling said jaws to release the fish line in response to tensioning of the line from the strike of a fish enabling said spring arm to self-return to said upright signalling position.

4. The device of claim 2 wherein said jaws are movable apart from one another in response to a bodily applied pinching force to said clamp as said opening force.

5. The device of claim 2 wherein said spring clip includes a spring constantly urging said jaws together with said line clamping force.

6. The device of claim 5 wherein said spring clip includes a pair of laterally adjacent clamp arms having said jaws at one end thereof and having a pair of compressible handle portions adjacent the other end.

7. The device of claim 6 wherein said spring acts on said handles to force them apart and in turn forcing said jaws together.

8. The device of claim 7 wherein said arms are coupled by a pivot connection between said jaws and said handle portions and said spring comprises a torsion spring mounted by said pivot connection.

9. The device of claim 2 wherein said jaws have generally planar gripping surfaces.

10. The device of claim 9 wherein at least one of said gripping surfaces is pliable.

11. The device of claim 9 wherein only one of the gripping surfaces is pliable.

12. The device of claim 2 wherein said jaws present generally planar gripping surfaces and are fabricated of a malleable metal enabling said jaws to be bodily bent to adjust the relative angular positions of said gripping surfaces to accommodate fish line of different diameter.

13. The device of claim 2 wherein said spring clip includes a pair of laterally adjacent arms having said jaws at one end thereof and compressible handle portions adjacent an opposite end, said arms being coupled by a pivot connection between said jaws and said handle portions such that inward movement of said handles causes corresponding outward movement of said jaws, said spring clip further including a spring mounted between said arms acting to urge said handles constantly outwardly and said jaws constantly inwardly.

14. The device of claim 2 wherein said indicator arm comprises a flat spring steel strip.

15. The device of claim 14 wherein said strip is measures 18 inches in length, ¼ inches in width and 0.015 inches in thickness.

16. The device of claim 14 wherein one of said handle portions is fixed to said strip and said jaws extend beyond said free end in prolongation of said strip.

17. The device of claim 16 wherein the other of said handle portions is movable relative to said fixed handle and said strip to operate the opening and closing movements of said jaws, said other handle portion being aligned in the lengthwise direction of said strip.

18. The device of claim 2 wherein said mounting clamp comprises a spring clamp.

19. The device of claim 1 including an indicator flag attached to said signal arm and malleable support structure associated with said flag to enable said flag to be deformed and retained in selected one of a plurality of shapes.

20. The device of claim 19 wherein said malleable support structure comprises a detachable wire form support.

21. The device of claim 1 wherein said indicator arm includes at least two sections one of which is fixed to said mounting clamp and the other of which is coupled slidably to said fixed section to enable adjustment in the overall effective length of said arm.

22. A clip-on tip-up device for a fishing rod comprising:
a first spring clip mounting clamp having arcuate jaws aligned on opposite sides of a central axis and spring-biased relatively toward one another enabling said spring clip to be attached releasably to a fishing rod with said central axis extending lengthwise of the pole;

a signal arm fabricated of flat spring steel banding material fixed at one end to said first spring clip and extending therefrom to a free end for movement between an unstressed upright signalling position and a bent over set position;

a flag secured to said signal arm adjacent said free end; and a second spring clip line clamp fixed to said signal arm adjacent said free end having a pair of opposed jaws with generally planer gripping surfaces at least one of which is pliable, said jaws being spring-biased constantly toward one another but movable apart in response to application of a bodily pinching force to said clamp to accommodate the placement of a length of fishing line of the rod between said jaws when said signal arm is bent to said set position, said jaws being self-returnable toward one another in response to removing said applied pinching force to grip and releasably hold the fish line between said jaws with sufficient line clamping force to retain said spring arm in said set position while enabling said jaws to release the fish line in response to the line being tensioned from the strike of a fish enabling said spring arm and said flag to self-return to said upright signalling position.

23. A clip-on tip-up device for a fishing rod comprising:
a signal arm fabricated of resilient springy material extending longitudinally between a base end and an opposite free end;

a releasable mounting clamp secured to said base end of said signal arm for detachably mounting said signal arm to the fishing rod and supporting said free end of said signal arm for movement between an unstressed upright signalling position and a bent over set position; and line clamping means mounted on said free end of said signal arm for clamping said signal arm directly to fishing line of the rod with a clamping force sufficient to support said signal arm in said set position until such time as the line is tensioned by action a fish strike whereupon said clamping means releases the line enabling said signal arm to return to said upright signalling position.

24. A method of mounting a clip-on tip-up device to a fishing rod, the device having an elongate signal arm portion fabricated of springy material secured at one end thereof to a releasable mounting clamp and supporting adjacent an opposite end thereof a line clamp, said method comprising the steps of:
attaching the mounting clamp to the fishing rod to support the signal arm in an unstressed generally upright signalling position extending laterally of the rod;

bodily deforming the signal arm to a bent over set position;

while holding the signal arm in the set position, clamping a section of fish line of the rod releasably between opposed inwardly biased clamping portions of the line clamp such that upon releasing the signal arm the arm is held in the set position by engagement of the line clamp with the fishing line until such time as a fish strikes a bait secured to the line causing the line to tension an pull free of the line clamp whereupon the signal arm snaps to the upright position to communicate to a fisherman that a fish has taken the bait.

* * * * *